United States Patent [19]

Ulrich et al.

[11] 3,844,787

[45] Oct. 29, 1974

[54] PROCESS OF CHEMICALLY BONDING A DYESTUFF TO A SUBSTRATE

[75] Inventors: Henri Ulrich, Northford; Fred A. Stuber, North Haven, both of Conn.

[73] Assignee: The Upjohn Company, Kalamazoo, Mich.

[22] Filed: July 23, 1973

[21] Appl. No.: 381,574

Related U.S. Application Data

[62] Division of Ser. No. 246,855, April 24, 1972, Pat. No. 3,763,118.

[52] U.S. Cl. .................... 96/35.1, 8/2, 8/31, 8/DIG. 7, 96/36.2, 96/49, 96/91 N, 96/115 R, 117/93.31, 117/138.8 E, 204/159.14

[51] Int. Cl. .................... G03c 1/70, G03c 1/52

[58] Field of Search .......... 8/2, 31, DIG. 7; 96/35.1, 96/36.2, 49, 91 N, 115 R; 117/93.31, 138.8 E; 204/159.14

[56] References Cited

UNITED STATES PATENTS

| | | | |
|---|---|---|---|
| 3,652,599 | 3/1972 | Sayigh et al. | 260/349 |
| 3,657,199 | 4/1972 | Sayigh et al. | 260/78.5 T |
| 3,699,080 | 10/1972 | Sayigh et al. | 260/47 CZ |
| 3,711,244 | 1/1973 | Sayigh et al. | 8/2 |
| 3,792,025 | 2/1974 | Ulrich et al. | 260/78.5 T |

*Primary Examiner*—Ronald H. Smith
*Attorney, Agent, or Firm*—Denis A. Firth; John Kekich

[57] ABSTRACT

Radiation (thermal and light)-sensitive polymers are provided characterized by the presence, in combination in the same molecule, of each of two recurring units, each unit corresponding to the formula:

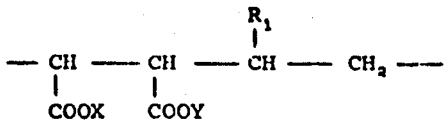

where $R_1$ = lower-alkoxy or phenyl. In the case of one of the two units, one of X and Y represents hydrogen and the other represents dialkylaminohydrocarbyl; in the case of the second unit, one of X and Y represents hydrogen and the other represents:

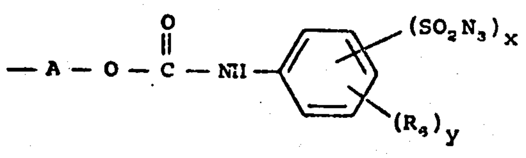

where $A$ = alkylene from 2 to 10 carbon atoms having from 2 to 6 carbon atoms between valencies, $R_8$ = lower-alkyl or halogen, $x$ = 1 or 2, $y$ = 0 to 2 and $x$ + $y$ = 1 to 3. Water soluble salts are also disclosed. The above polymers are useful for chemically bonding acid or basic dyestuffs to non-dye receptive substrates (e.g., polyethylene) by coating the substrate with the above polymer and exposing the coated substrate to irradiation. The treated substrate is then contacted with an acid, direct, or basic dyestuff. The irradiation can be carried out imagewise, and the image developed by removing the unexposed polymer prior to application of the dye. Bonding of the radiation-sensitive polymers of the invention to substrates in the above manner can also be employed as a means of rendering hydrophilic a variety of substrates which are normally hydrophobic.

4 Claims, No Drawings

PROCESS OF CHEMICALLY BONDING A DYESTUFF TO A SUBSTRATE

This is a division of application Ser. No. 246,855 filed Apr. 24, 1972, now U.S. Pat. No. 3,763,118.

BACKGROUND OF THE INVENTION

1. Field of the Invention

This invention relates to novel radiation-sensitive polymers and is more particularly concerned with radiation-sensitive polymers having free carboxy, azidosulfonyl carbanilylalkoxycarbonyl moieties and dialkylaminohydrocarbyl moieties in the recurring unit thereof and with salts thereof, and with the use of said polymers to produce continuous tone images without the use of silver and/or to modify the properties of substrates which are normally hydrophobic and/or not receptive to dyestuffs.

2. Description of the Prior Art

The preparation of photoresists and the like by exposing to radiation a substrate coated with a radiation-sensitive polymer containing pendant azido groups in the chain thereof is described in U.S. Pat. Nos. 2,948,610 and 3,002,003. A closely related process involving the use of radiation-sensitive polymers containing pendant sulfonylazido groups is disclosed in U.S. Pat. No. 3,449,294 and 3,453,108. None of these references discloses a radiation-sensitive polymer which can be used to bond dyestuffs to a substrate.

In copending application Ser. No. 93,446, filed Nov. 27, 1970, now U.S. Pat. No. 3,784,527, in the name of one of us, namely Fred A. Stuber, there is described a group of radiation-sensitive polymers containing sulfonylazido groups and free carboxy groups in the recurring units of the polymer, which polymers can be employed to bond basic dyestuffs to a variety of substrates. We have now developed a polymer which is capable of bonding acid, direct and basic dyestuffs to a variety of substrates.

SUMMARY OF THE INVENTION

The present invention comprises a radiation-sensitive polymer characterized by the presence, in combination in the same molecule, of each of two recurring units, one of which has the formula:

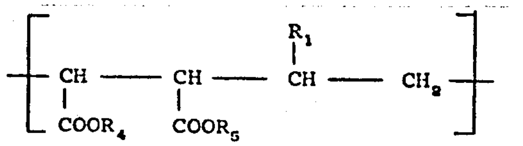

(I)

wherein $R_1$ is selected from the class consisting of alkoxy and phenyl, one of $R_2$ and $R_3$ represents hydrogen and the other represents di (lower-alkyl) aminohydrocarbyl wherein hydrocarbyl contains from 1 to 12 carbon atoms, inclusive; and the other of said recurring units is represented by the formula:

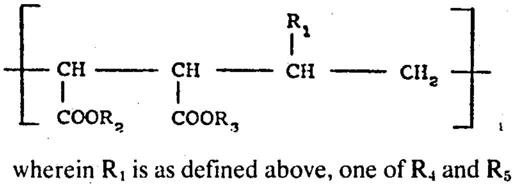

, (II)

wherein $R_1$ is as defined above, one of $R_4$ and $R_5$ represents hydrogen and the other represents a group of the formula:

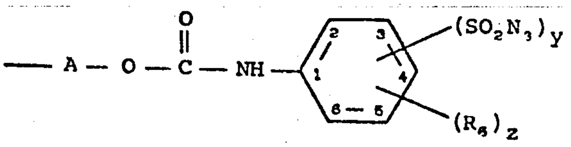

wherein A is alkylene having from 2 to 6 carbon atoms separating the valencies and a total carbon atom content of from 2 to 10, $R_3$ is selected from the class consisting of lower-alkyl and halogen, $y$ is an integer from 1 to 2, $z$ is an integer from 0 to 2, provided that $y + z$ is not greater than 3, and the $SO_2N_3$ group is in any of positions 3, 4, and 5 in the phenyl nucleus to which it is attached, and at least one of the said positions 3, 4, and 5 is unsubstituted.

The polymers of the invention can also exist in the form of salts such as the acid addition salts and the salts with salt-forming moieties such as alkali metals, alkaline earth metals, ammonia and tertiary amines.

The present invention also comprises processes for employing the radiation-sensitive polymers defined above to modify the surface properties of substrates and to bond chemically both acid and/or basic and/or direct dyestuffs to substrates particularly those which are not normally receptive to such dyestuffs.

The term "alkylene having 2 to 6 carbon atoms separating the valencies and a total carbon atom content from 2 to 10" means a divalent aliphatic hydrocarbon radical having the stated carbon atom content in the chain separating the valencies and overall. Illustrative of such radicals are ethylene, 1,2-propylene, 1,3-propylene, 1,4-butylene, 1,2-pentylene, 1,3-hexylene, 2,2-dimethyl-1,3-propylene, 2-methyl-1,4-butylene, 3-methyl-1,2-pentylene, 2-ethyl-1,2-octylene and the like.

The term "lower-alkyl" means alkyl from 1 to 6 carbon atoms, inclusive, such as methyl, ethyl, propyl, butyl, pentyl, hexyl, and isomeric forms thereof. The term "lower-alkoxy" means alkoxy from 1 to 6 carbon atoms, inclusive, such as methoxy, ethoxy, propoxy, butoxy, pentyloxy, hexyloxy, and isomeric forms thereof. The term "halogen" is employed in its usually accepted sense as being inclusive of fluorine, chlorine, bromine, and iodine.

The term "di(lower-alkyl)aminohydrocarbyl wherein hydrocarbyl contains from 1 to 12 carbon atoms, inclusive" means a group of the formula:

$$—Q—N(\text{lower-alkyl})_2$$

wherein "lower-alkyl" is as above defined and Q represents the residue of a hydrocarbon having from 1 to 12 carbon atoms, inclusive, from which two hydrogen atoms have been removed. Illustrative of such groups are di(lower-alkyl)aminoalkyl such as dimethylaminomethyl, 2-dimethylaminoethyl, 3-dimethylaminopropyl, 2-diethylaminohexyl, 3-dipropylaminoethyl, 2-N-methyl-N-butylaminoethyl and the like; di(lower-alkyl)aminoaryl such as 3-dimethylaminophenyl, 4-diethylaminophenyl, 4-dimethylamino-3-methylphenyl, 4-dimethylamino-2,6-xylyl, 4-(4-dimethylaminophenyl)phenyl, 4-diisopropylaminophenyl, 2-dimethylaminonaphthyl, and the like; di(lower-alkyl)aminoalkaryl such as 4-(dimethylaminomethyl)-phenyl, 4-(diethylaminomethyl)phenyl, 4-(2-diethylaminopropyl)phenyl, 3-(4-N-methyl-N-pentylaminobutyl)phenyl, 3-methyl-4-(5-dimethylaminophenyl)phenyl, 3,5-dimethyl-4-(1-dimethylaminohexyl)phenyl, 2-dimethylaminomethylnaphthyl and the like; di(lower-alkyl)aminoaralkyl such as 4-dimethylaminophenethyl,2-(4-diethylaminophenyl)-propyl, 2-(4-N-methyl-N-butylaminophenyl)hexyl, 1-(2-dimethylaminonaphthyl)methyl, 2-(4-dimethylaminonaphthyl)ethyl and the like; di(lower-alkyl)aminocycloalkyl such as 2-dimethylaminocyclohexyl, 3-diethylaminocyclohexyl, 2-dibutylaminocyclopentyl, 2-dipropylaminocycloheptyl, 3-(N-methyl-N-hexylamino)cyclooctyl and the like.

The term "radiation-sensitive" is used herein to indicate that the polymers of the invention can be activated and undergo molecular modification on exposure to thermal and/or actinic radiation.

In addition to their usefulness in chemically bonding acid, direct, and basic dyestuffs to polymeric and other substrates, and in producing continuous tone, non-silver containing images, the radiation-sensitive polymers of the invention, characterized by the combination of recurring units (I) and (II), are useful in converting normally hydrophobic polymer materials to hydrophilic materials and in the preparation of photoresist systems, as will be discussed more fully hereinafter.

DETAILED DESCRIPTION OF THE INVENTION

The novel radiation-sensitive polymers of the invention are prepared conveniently from the appropriate copolymer of maleic anhydride with styrene or a lower-alkyl vinyl ether. The latter copolymers are well-known in the art and are characterized by a recurring unit having the following structure:

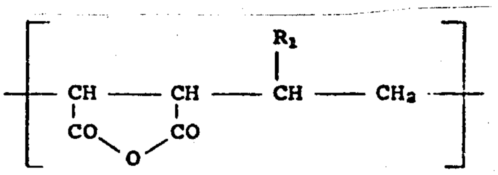

(III)

wherein $R_1$ is as defined above.

In one alternative manner of preparation of the polymers of the invention, the copolymer (III) is reacted with a mixture of:

a. an alcohol of the formula:

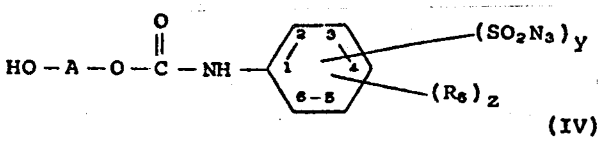

(IV)

wherein A, $R_6$, $y$ and $z$ are as hereinbefore defined and b. an alcohol of the formula:

$$HO—Q—N(lower\text{-}alkyl)_2 \qquad (V)$$

wherein Q and lower-alkyl are as hereinbefore defined.

The reaction in question is carried out in the presence of a tertiary base and, advantageously, in the presence of an inert organic solvent. Examples of tertiary bases which can be used, and which are generally present in the reaction mixture in an amount corresponding to at least 10 percent by weight of copolymer (III), are pyridine, N,N-dimethylaniline, triethylamine, N-methylmorpholine, N-methylpiperidine, and the like. Pyridine is the preferred tertiary base and can, if desired, be used in sufficient amounts to act as solvent as well as catalyst for the reaction. Indeed, in a most preferred embodiment, the reaction is carried out with all the reactants in solution in pyridine.

However, in place of the excess of pyridine as solvent, there can be used as inert organic solvent, i.e., an organic solvent which does not enter into reaction with any of the reactants or interfere in any way with the desired course of the reaction. Examples of inert organic solvents are acetonitrile, acetone, cyclohexanone, tetrahydrofuran, dioxane and the like.

The reaction is advantageously carried out at elevated temperature, i.e., from about 50°C to about 100°C in order to achieve a suitable rate of reaction. The course of the reaction can be followed by routine procedures, for example, by infrared spectroscopic examination of aliquots.

The relative molar proportions in which the above reactants are brought together will determine the relative proportions in which the recurring units (I) and (II) are present in the resulting radiation-sensitive polymer of the invention. Thus, the molar proportions in which the alcohols (IV) and (V) are present relative to each other in the reaction mixture can vary from about 9:1 to 1:9 and the ratio of recurring units (II) and (I) in the resulting polymer will vary in the same range.

Further, if the total molar proportion of the alcohols (IV) and (V) employed in the reaction mixture is substantially equal to the molar proportion of starting copolymer (III) then all the anhydride groups orginally present in the latter will be involved in reaction with alcohols (IV) and (V) to form recurring units (II) and (I) respectively. Under these circumstances there will no remaining anhydride moieties in the resulting polymer. Where the total molar proportion of alcohols (IV) and (V) is less than the molar proportion of starting copolymer (III), the resulting polymer will contain unreacted anhydride moieties, i.e., will contain recurring units of the formula (III) in addition to units of the formulae (I) and (II). The ratio of total molar proportion of the alcohols (IV) and (V) to molar proportion of starting copolymer (III) can vary from about 0.2:1 to about 1:1.

When the process is carried out in the above manner by reacting the starting copolymer (III) with a mixture of the two alcohols (IV) and (V), the resulting polymer will have a random distribution of recurring units (I) and (II) in the chain thereof. Where the total molar proportion of the alcohols (IV) and (V) is less than that required to react with all the anhydride groups in the starting copolymer (III) there will be a random distribution of the recurring units of the starting copolymer in the final product in addition to the recurring units (I) and (II).

When the reaction of the starting copolymer and the alcohols (IV) and (V) is adjudged complete (as determined by infrared spectroscopic analysis or other appropriate analytical technique), the desired radiation-sensitive polymer is isolated from the reaction product by procedures conventional in the art. Generally the desired polymer shows no substantial solubility in the inert organic solvents employed in the reaction mixture and, accordingly, isolation of the desired product involves merely a filtration or other separation procedure to isolate the insoluble product which are separated from solution during the reaction. Purification of the product can be effected, if desired, by routine procedures such as by solvent extraction, reprecipitation from aqueous solution, chromatography and the like.

The reaction of the alcohols (IV) and (V) with the anhydride moieties present in the starting copolymer gives rise to one free carboxy group and one esterified carboxyl group on adjacent carbon atoms in the polymer chain. The reaction can be represented as follows:

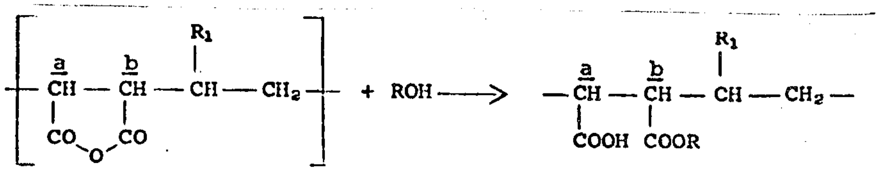

wherein ROH represents the alcohol reactant for sake of simplicity. In the above equation it will be seen that the reaction would give rise to formation of a free carboxyl group attached to the carbon atoms designated *a* and an esterified carboxyl group attached to the carbon atom *b* of the starting copolymer. It will be apparent to one skilled in the art that the reaction can also proceed in the reverse manner in that the esterified carboxyl group is attached to the carbon atom designated *a* and free carboxyl group is attached to the carbon atom designated *b*. It will be further apparent to one skilled in the art that the radiation-sensitive polymer of the invention will contain some recurring units having the one structure and other recurring units having the other structure. It is therefore to be understood that the general formulae (I) and (II) which show the characteristic recurring units appearing in the chain of the radiation-sensitive polymer of the invention are intended to embrace and represent all the possible structures within the polymer chain discussed above.

In an alternative method of preparation of the radiation-sensitive polymers of the invention, the two alcohols (IV) and (V) are reacted sequentially, rather than simultaneously, with the starting copolymer. The order in which the two alcohols are reacted is not critical. The reaction conditions for each of the two reactions in the sequence can be the same as those described for the simultaneous reaction of both alcohols as described above. The relative molar proportions of the two alcohols (IV) and (V) with respect to each other and to the starting copolymer fall within the same range as those discussed above for the simultaneous reaction of both alcohols (IV) and (V).

The radiation-sensitive polymers of the invention are, for the most part, highly soluble in water and have relatively low solubility in organic solvents. This is attributed to the fact that the recurring unit (I) in said polymer will normally exist in Zwitterion form. Thus, in the case of one of the two possible structures which is represented by the recurring unit (I) the interaction of the free carboxylic acid group and the dialkylaminohydrocarbyl esterified carboxylic group will give rise to the following betaine or Zwitterion group:

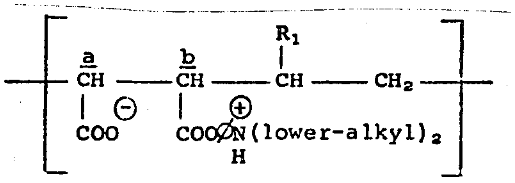

The same considerations will apply to the other possible configuration of the recurring unit (I) i.e., that in which the free carboxylic acid group is attached to carbon atoms *b* and the esterified carboxyl group is attached to carbon atoms *a*.

The solubility in water of the radiation-sensitive polymers of the invention will be approximately proportional to the number of recurring units of formula (I) in the molecule. When the number of each units is in the lower end of the range discussed above the solubility in water will be less than in the higher ranges. If desired, the water solubility of those polymers which contain relatively few groups of formula (I) can be increased by forming salts of the polymers of the invention either through use of the free carboxyl groups in recurring units (I) and (II) or by use of the tertiary amino groups in recurring units (I).

Thus, by virtue of the free carboxyl group in the recurring unit (I) and (II) of the radiation-sensitive polymers of the invention, said polymers can be converted to the corresponding carboxylic acid salts by reaction with the appropriate base. As will be obvious to one skilled in the art, it is possible to convert only one, or several, or all of the plurality of free carboxyl groups in the chain of the polymer of the invention to the corresponding salts. The polymers of the invention in which one or more or all of the free carboxylic groups are converted to salts are included within the scope of the invention.

Illustratively, the polymers of the invention can be converted to their alkali metal, alkaline earth metal, ammonium and organic amine salts. "Alkali metal" is inclusive of sodium, potassium, lithium, rubidium, caesium and the like. "Alkaline earth metal" is inclusive of calcium, barium, strontium, magnesium and the like. "Organic amine" is inclusive of monoalkylamines such as methylamine, ethylamine, isopropylamine, sec-butylamine, amylamine, hexylamine, isohexylamine, octylamine and the like; dialkylamines such as dimethylamine, N-ethyl-N-methylamine, N-methyl-N-propylamine, N-methyl-N-isobutylamine, diisopropylamine, N-ethyl-N-hexylamine, N-methyl-N-isooctylamine and the like; trialkylamines such as triethylamine, triethylamine, N,N-dimethylpropylamine, N,N-dimethylhexylamine, N,N-diethylisobutylamine and the like; monoalkenylamines such as allylamine, 2-butenylamine, 3-hexenylamine, octenylamine and the like; dialkenylamines such as diallylamine, di-2-butenylamine, di-3-hexenylamine and the like; cycloalkylamines such as cyclopropylamine, cyclobutylamine, cyclopentylamine, cyclohexylamine and the like; N-alkyl-cycloalkylamines such as N-methylcyclopentylamine, N-ethylcyclopentylamine, N-propylcyclohexylamine and the like; cycloalkenylamines such as cyclopentenylamine, cyclohexenylamine, cyclooctenylamine, and the like; aralkylamines such as benzylamine, phenethylamine, phenylpropylamine, benzhydrylamine and the like; N-alkyl-N-aralkylamines such as N-methylbenzylamine, N-propylbenzylamine, N-isobutylbenzylamine, N-octylbenzylamine, N-methylphenethyamine and the like; N,N-disubstituted aralkylamines such as N,N-dimethylbenzylamine, N-methylbenzhydrylamine, N,N-diethyl-3-phenylpropylamine, N-butyl-2-phenethylamine and the like; N-alkyl-arylamines such as N-methylaniline, N-isopropylaniline, N-hexylaniline, N-methyl-p-toluidine, N-ethyl-m-xylidine, N-methylnaphthylamine, N-methylbenzidine, N,N'-dimethylbenzidine and the like; N,N-dialkylarylamines such as N,N-dimethylaniline, N,N-dibutylaniline, N-hexyl-N-methylaniline, N,N-dimethyltoluidine and the like; N-aralkyl-arylamines such as N-benzylaniline, N-phenethylaniline, N-benzhydrylaniline and the like; arylamines such as aniline, o-, m-, and p-toluidine, o-, m-, and p-xylidine, 1-naphthylamine, 2-naphthylamine and the like; alkanolamines such as ethanolamine, propanolamine, diethanolamine and the like; heterocyclic amines such as pyridine, quinoline, pyrrolidine, piperazine, morpholine, and alkyl-substituted pyrrolidines, piperidines, piperazines and morpholines, such as N-methylpyrrolidine, N-ethylpiperidine, N-methyl-N'-hexylpiperazine, N-methylmorpholine and the like.

The above salts of the polymers of the invention can be prepared readily from the free carboxylic acid polymers of the invention by any of the methods conventionally used in the art for preparing carboxylic acid salts of this type. Illustratively, the free carboxylic acid polymer is dissolved in a water-miscible solvent such as acetone and treated with the appropriate amount of base to neutralize some or all of the free carboxyl groups in the polymer. In the preparation of the alkali metal, alkaline earth metal, or ammonium salts, the base is advantageously in the form of an aqueous solution of the corresponding hydroxide or carbonate or an alcohol solution of the corresponding alkoxide. In the case of the amine salts, the free amine is used as the base, advantageously as a solution in a water-miscible solvent. the resulting salt separates from solution particularly if there is little or no water present in the reaction mixture. Alternatively, the salt can be isolated by partial or complete evaporation of the solution or by addition of an appropriate solvent in which the salt is insoluble.

It will be readily appreciated by one skilled in the art that part of the free carboxylic acid groups in the polymers of the invention can be converted to be corresponding salt using a first base, and some or all of the remaining free carboxylic acid groups in the partially neutralized polymer can be reacted with a second base and even with a third or fourth base so as to produce mixed salts of the polymers of the invention.

Similarly, by virtue of the dialkylamino groups in the recurring units (I) of the radiation-sensitive polymers of the invention, the latter can be converted to their acid addition salts with acids such as mineral acids and organic carboxylic acids. Illustrative of the acid addition salts of the polymers of the invention are the salts with sulfuric, hydrochloric, nitric, phosphoric, hydrobromic, acetic, oxalic, benzoic, propionic, butyric, methanesulfonic, p-toluenesulfonic, succinic, maleic, malic, fumaric, salicylic, and trifluoracetic acids and the like.

In general the molecular weight of the radiation-sensitive polymers of the invention will be within the range of about 100,000 to about 2,000,000. Said polymers are, for the most part, resinous solids which are soluble in water and in mixtures of water and polar solvents such as acetone, methyl ethyl ketone, tetrahydrofuran, dioxane and the like, from which they can be cast as films as will be described in more detail hereinafter.

The maleic anhydride copolymers having the recurring unit (III) which are employed as starting materials in the process of the invention are well-known in the art; see, for example, Encyclopedia of Chemical Technology, edited by Kirk-Othmer, Interscience, New York, N.Y., 1965, Vol. 8, pages 685, et seq. and Vol. 11, page 652; U.S. Pat. Nos. 2,424,814 and 2,047,398. These copolymers can be obtained in a wide range of molecular weight, namely, from about 100,000 to about 1,250,000. As will be appreciated by one skilled in the art, the chain length of the starting maleic anhydride copolymer will remain unaffected by the conversion to the half ester polymer having the recurring unit (I) and (II) although the overall molecular weight of the polymer will increase according to the number of anhydride moieties in the starting copolymer which are converted to half-ester moieties. The alcohols (IV) which are employed as starting materials in preparing the polymers of the invention, are known in the art; see U.S. Pat. No. 3,652,599.

Similarly, the alcohols of formula (V) which are employed as starting materials in the preparation of the radiation-sensitive polymers of the invention are known in the art and are prepared by conventional techniques.

The radiation-sensitive polymers of the invention are useful in a variety of ways. For example, said polymers can be used as a means of chemically bonding acid, and/or direct and/or basic dyestuffs to the surface of a variety of substrates such as paper, cotton, and like cellulosic materials, metal, glass and the like as well as substrates which contain a plurality of —C—H bonds, such as polyolefins, polyurethanes, polyamides, polyesters, polyacetals and the like, which are not normally receptive to such dyestuffs. In this particular use of the polymers of the invention, a coating of the polymer is applied to a part, or the whole, of the surface of the substrate to be treated. The coating is applied advantageously by dissolving the radiation-sensitive polymer of the invention in a polar solvent, such as exemplified above, and spreading the solution on the substrate using the appropriate spreading means.

The coated substrate is then exposed to an appropriate source of radiation, either thermal or actinic, necessary to activate the polymer of the invention. A wide variety of sources of thermal and/or actinic radiation can be employed. Such sources include carbon arcs, mercury vapor lamps, fluorescent lamps, argon glow lamps, photographic flood lamps, and tungsten lamps. Preferably, the source of radiation is one which generates ultraviolet light of wavelength within the range of about 250 nm to about 390 nm.

If desired, the irradiation of the coated substrate can be performed "imagewise; " that is to say, a negative of an image to be produced on the surface of the substrate is interposed between the coated substrate and the source of radiation. The radiation-sensitive polymer in those portions of the coated substrate receiving the radiation is activated and becomes chemically bonded to the surface of the substrate. The chemical bonding of the radiation-sensitive polymer to the substrate is believed to take place by degradation of the sulfonazido group or groups in the moieties (II) to yield a nitrene radical which enters into interaction with —C—H bonds in the substrate. This suggested reaction mechanism is, however, offered by way of explanation only and is not intended in any way to define or limit the scope of the present invention.

When the coating of the polymer of the invention has been bonded to the substrate in the above manner, the surface of the substrate, or in the case of imagewise irradiation, that portion of it bearing the irradiated image, has directly bonded to it a series of free carboxyl groups in the recurring units (I) and (II). The resulting image can be developed by removal of unchanged polymer from unirradiated areas and treatment of the irradiated surface with an acid direct and/or basic dye thereby achieving chemical bonding of the dyestuff to the surface of the substrate via said free carboxyl groups.

The removal of the unchanged polymer from the non-irradiated areas can be accomplished, using water or polar solvent/water mixtures and advantageously, the same solvent as was used in coating the substrate originally.

The application of the dyestuff to the treated substrate, after development if required, can be accomplished in any conventional manner, as by dipping in a bath of dyestuff, or application of dye by roller, sponge and the like.

The term "basic dyestuff" is one well recognized in the art as characterizing a particular class of dyestuffs, namely those which will react with an acid (mineral acid or organic carboxylic acid) to form a corresponding salt. A comprehensive list of basic dyestuffs and a description of their properties is set forth in Colour Index, Second Edition, Vol. 1, pages 1617 to 1653, 1956, published jointly by The Society of Dyers and Colourists, Bradford, Yorkshire, England, and The American Association of Textile Chemists and Colorists, Lowell, Mass. Any of the basic dyestuffs set forth in said Colour Index can be employed in the process and compositions of the invention. Generally, said basic dyestuffs are employed in the form of aqueous solutions.

Typical of said basic dyestuffs are: crystal violet, methylene blue, malachite green, auramine O, basic fuchsin, Aniline Yellow, Disperse Orange 3, disperse Black 7, Disperse Red 13, Disperse Red 9, Vat Red 33, Mordant Violet 6, Phenylene blue, Disperse Orange 11, Natural Orange 6, Natural Brown 7, and Natural Yellow 12.

Similarly, the term "acid dyestuff" is one well recognized in the art as characterizing a particular class of dyestuffs, namely, those which will react with a base to form a corresponding salt. A comprehensive list of acid dyestuffs and a description of their properties is set forth in Colour Index ibid, Vol. 1 pages 1001–1404.

Typical of said acid dyestuffs are Acid Cyanine (acid blue 18), Acid Fuchsin (Acid violet 19), Alizarine Fast Violet (acid violet 48), Nedan Yellow (acid yellow 99).

Similarly a comprehensive list of "direct dyes" and a description of their properties is set forth in Colour Index ibid, Vol. 2, pages 2001–2359. Typical of said direct dyes are Direct Blue 6, Direct Green 8, Direct Yellow 62, Direct Blue 87, Direct Red 81, Direct Black 38.

As will be readily appreciated by one skilled in the art, the above process, for chemically bonding dyestuffs to polymeric substrates not normally receptive to such dyes, can be adapted to a variety of dyeing and/or printing techniques. For example, the printing of advertising and like matter on polymer films can be accomplished readily on a continuous basis by passing a continuous sheet of said film successively through zones in which the film is coated with a radiation-sensitive polymer of the invention, coated film is exposed imagewise to activating radiation from an appropriate source, the unexposed coating is removed using any of the procedures described above, and finally, the film with image bonded in place is contacted with the dye.

In an alternative, but less preferred, method of employing the novel polymers of the invention to chemically bond dyes to substrates, the novel polymer of the invention is treated with the dyestuff in a preliminary step and the radiation-sensitive polymer, with dye incorporated therein, is applied as a coating to the surface of the substrate to be treated. The coated substrate is then exposed to appropriate radiation to effect bonding of the radiation-sensitive polymer (with dye already attached) to the substrate. The exposure to radiation can be done imagewise, if desired, and the unexposed radiation-sensitive polymer plus dye can be eluted from the exposed surface leaving the required image bonded to the substrate.

In another, related, use of the novel radiation-sensitive polymers of the invention the latter are applied in the form of a coating to a substrate and bonded thereto by irradiation as described above. The surface of the substrate is thereby rendered hydrophilic by virtue of the carboxylic moieties and dialkylamino moieties present in the polymer. If desired, the carboxylic acid moieties can be converted to the corresponding alkali metal or alkaline earth metal, or ammonium salt phase and/or the dialkylamino groups can be converted to acid addition salts to increase or modify the hydrophilic properties. The above procedure represents a very convenient method of rendering hydrophilic the surfaces of substrates such as polyolefins and the like which are normally hydrophobic.

In yet another use of the novel radiation-sensitive polymers of the invention, the latter are employed as the components of a photoresist system. For example, the said polymers can be used in the photographic reproduction and printing arts to produce printed masters as follows. The polymer is dissolved in a polar organic solvent such as those exemplified above or, in the case of a salt of the polymer, the salt is dissolved in aqueous or polar solvent solution, and cast as a film on an appropriate substrate such as paper, metal and like film supports normally employed in the reproduction art. A negative of the image to be reproduced, e.g., lined, screened or half-tone negatives, or diapositives, is interposed between the supported film so obtained and a source capable of producing radiation necessary to activate the radiation-sensitive polymer. The polymer in those portions of the supported film exposed to the radiation is thereby bonded to the substrate. The polymer in the unexposed portions of the film can then be removed, using any of the techniques described above, leaving the exposed polymer bonded to the substrate in the form of a positive image corresponding to the negative used in the irradiation step. Said image has high resistance to solvents and mechanical stresses and can be used to advantage as a master from which to reproduce copies of the original.

In a similar manner photoresist systems produced from the radiation-sensitive polymers of the invention can be used in other photoresist applications such as in the printing of microcircuitry and related applications which involve production of an image, in the form of bonded polymer, on a metal substrate such as copper, followed by removal, in part or in toto, of the uncoated metal by etching. Essentially the same technique as that described above in the production of printed masters is employed in the formation of the polymer image on the substrates.

The radiation-sensitive polymers of the invention are additionally useful in that they can be used as electrolytes in the electrodeposition of polymer coatings on metals and the like in accordance with procedures well known in the art.

In any of the irradiation processes described above in which the radiation-sensitive polymers of the invention are bonded to substrates by exposure to appropriate radiation, there can be employed a sensitizer. The latter can be any of the sensitizers known in the art as useful in enhancing the sensitivity to radiation of azido and sulfonazido groups. Illustrative of such sensitizers are triphenylmethane dyes, aromatic ketones such as Michler's ketone, dimethylaminobenzaldehyde, 4-methoxyacetophenone, 2-methoxyxanthone, N-phenylthioacridone, 1,2-benzanthraquinone, 1,8-phthaloylnaphthalene, α-naphthquinone and the like, 5-nitroacenaphthene, pyrene, acridine, 2-nitrofluorene, 1-nitropyrene, the pyrylium, thiapyrylium and selenopyrylium dye salts disclosed in U.S. Pat. No. 3,475,176; and the various heterocyclic sensitizers listed in U.S. Pat. Nos. 3,528,812, 3,528,813, and 3,528,814. A particularly preferred form of sensitizer for use with the polymers of this invention is a built-in sensitizer which can be derived by introducing certaiin stilbene moieties into the chain of the radiation-sensitive polymers of the invention. This can be achieved by reacting the starting copolymer having recurring unit (III) with a third alcohol in addition to alcohols (IV) and (V). The reaction involving the three alcohols can be carried out simultaneously or sequentially as previously described. The third alcohol in question is one having the formula:

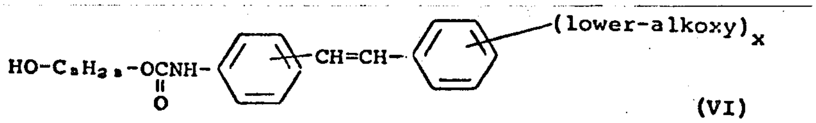

(VI)

wherein lower-alkoxy is as herinbefore defined, $x$ is an integer from 1 to 3 and $C_nH_{2n}$ represents alkylene having from 2 to 6 carbon atoms separating the valencies and a total carbon atoms content of from 2 to 10.

The stilbene compounds (VI) and processes for their preparation are described in our copending application Ser. No. 180,203 filed Sept. 13, 1971. The reaction of the stilbene compound (VI) with an anhydride moiety in a recurring unit (III) of the starting copolymer results in opening of the anhydride ring with simultaneous formation of a free carboxy group and an esterified carboxy group. As was explained in the corresponding reaction of alcohols (IV) and (V) the opening of the anhydride ring can give rise to two possible isomers and both isomers and mixtures thereof are within the scope of this invention. The proportion of stilbene moieties which are introduced into the radiation-sensitive polymers of the invention in this way is advantageously from about 5 to about 33 such stilbene moieties per 100 units corresponding to the formula (II) in the radiation-sensitive polymers of the invention.

The following examples describe the manner and process of making and using the invention and set forth the best mode contemplated by the inventors of carrying out the invention but are not to be construed as limiting.

EXAMPLE 1

To a solution of 4.7 g (0.03 mole) of a poly(maleic anhydride co-methylvinyl ether) [having an average molecular weight of 250,000: Gantrez AN119] and 2.9 g (0.01 mole) of 2-hydroxyethyl 4-azidosulfonylcarbanilate [U.S. Pat. No. 3,652,599] in 100 ml of acetonitrile was added, in four equal portions over a period of 2 hours, a solution of 0.9 g (0.01 mole) of N,N-dimethylethanolamine in 10 ml of acetonitrile. After the addtion was complete the reaction mixture was allowed to stand overnight at room temperature (circa 25°C). The solid which had separated was then isolated by filtration, washed with acetonitrile and dried in vacuo.

There was thus obtained a light pink colored, solid, photo-sensitive polymer in which approximately one out of three of the recurring units has the formula:

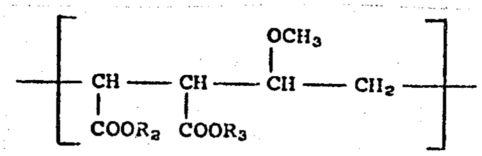

where one of $R_2$ and $R_3$ represents hydrogen and the other represents $$—CH_2CH_2N(CH_3)_2$$

(said unit being in Zwitterion form) and one out of three of the recurring units has the formula:

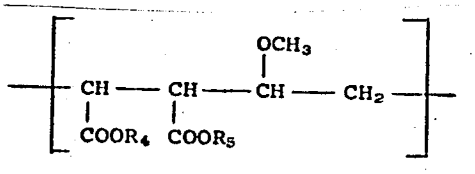

wherein one of $R_4$ and $R_5$ is hydrogen and the other is

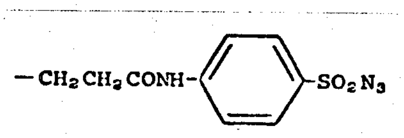

and wherein the remaining recurring units in said photosensitive polymer chain have the formula:

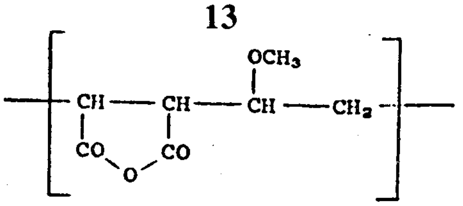

A solution of 1 g of the above polymer in 50 ml of a mixture of equal parts of water and acetone was coated on a piece of Mylar film. The coated film was then exposed, via a negative, to ultraviolet light generated by a 200W mercury lamp. The exposure time was 60 seconds and the light intensity was $2mW/cm^2$. The resulting exposed layer was developed under water and the developed image was made visible by immersion in a 1 percent solution of methylene blue containing 0.5 percent by weight of sodium chloride. The resulting image was very sharp and clear with fine resolution.

EXAMPLE 2

The procedure described in Example 1 was repeated using the following proportions of reactants. A solution of 2.7 g (0.03 mole) of N,N-dimethylethanolamine in 40 ml of acetonitrile was added slowly over a period of 6 hours to a solution of a mixture of 2.9 g (0.01 mole) of 2-hydroxyethyl 4-azidosulfonylcarbanilate and 3.1 g (0.02 mole) of Gantrez AN119 in 150 ml of acetonitrile. The addition was carried out at room temperature (approximately 25°C) and the resulting mixture was allowed to stand overnight. The solid which had separated was isolated by filtration, washed with acetonitrile, and dried in vacuo. There was thus obtained 5.6 g of a white solid photosensitive polymer in which approximately one out of two of the recurring units had the formula:

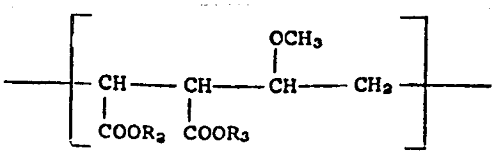

wherein one of $R_2$ and $R_3$ represents hydrogen and the other represents $$-CH_2CH_2N(CH_3)_2$$

(said unit being in Zwitterion form) and the remaining recurring units had the formula:

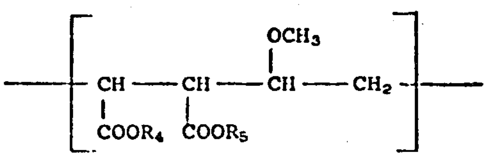

wherein one of $R_4$ and $R_5$ is hydrogen and the other is

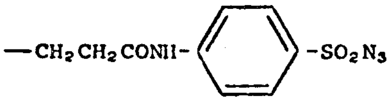

This material, so obtained, was found to be freely soluble in water but substantially insoluble in acetone, 4-methyl-2-pentanone, and 2-butanone. However the addition of small amounts of water to each of the latter solvents rendered the material soluble therein.

A piece of nylon fabric was coated with a thin film of a 5 percent aqueous solution of the above radiation-sensitive polymer. The coated fabric was exposed, via a negative, to radiation from a 150W xenon lamp for 3 minutes; the fabric was in a plane at a distance of 100 cm from the lamp during exposure. The exposed fabric was developed and dyed by immersion in a 2 percent solution of Direct Blue 87 in 1 percent acetic acid. The resulting image was sharp and clear with fine resolution.

EXAMPLE 3

Using the procedure described in Example 1 for the preparation of a radiation-sensitive polymer of the invention, but replacing the N,N-dimethylbutanolamine, by an equivalent amount of N-methyl-N-ethylethanolamine, N,N-dimethylbutanolamine, N,N-diethylhexanolamine, 4-dimethylaminophenol, 1-dimethylamino-naphthol-4, 4-(dimethylaminomethyl)phenol, 4-dimethylaminophenethanol, 1-(2-dimethylaminonaphthyl)methanol, and 2-dimethylaminocyclohexanol, there are obtained the radiation-sensitive polymers of the invention having the same proportion of the three recurring units as set forth in Example 1, wherein $R_4$ and $R_5$ are as defined in said Example, and wherein one of $R_2$ and $R_3$ represents hydrogen and the other represents N-methyl-N-ethylaminoethyl, N,N-dimethylaminobutyl, N,N-diethylaminohexyl, 4-dimethylaminophenyl, 1-dimethylaminonaphthyl-4, 4-(dimethylaminomethyl)phenyl, 4-dimethylaminophenethyl, 1-(2-dimethylaminonaphthyl)methyl, or 2-dimethylaminocyclohexyl, respectively.

EXAMPLE 4

To a solution of 8.5 g (0.03 mole) of the radiation-sensitive polymer prepared as described in Example 1 in 50 ml of a mixture of equal parts by volume of acetone and water was added slowly, with shaking, a solution of 3.5 g (0.01 mole) of 2-hydroxyethyl) trans - 2,5-dimethoxystilbene-4'-carbamate in 50 ml of acetone. After the addition was complete the reaction mixture was allowed to stand overnight and the solid which had separated was isolated by filtration, washed with acetone and dried in vacuo.

There was thus obtained a solid photosensitive polymer with built-in sensitizer in which approximately one out of three of the recurring units had the formula:

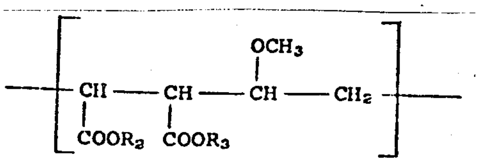

wherein one of $R_2$ and $R_3$ represents hydrogen and the other represents dimethylaminoethyl (said unit being in Zwitterion form), one out of three of the recurring units had the formula:

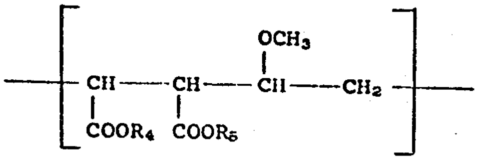

wherein one of $R_4$ and $R_5$ is hydrogen and the other is

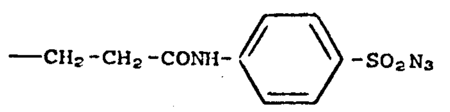

and wherein the remaining recurring units in said polymer chain had the formula:

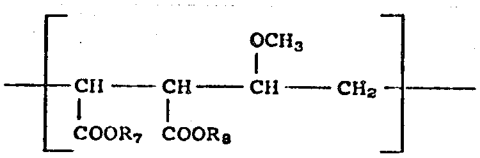

wherein one of $R_7$ and $R_8$ represents hydrogen and the other is

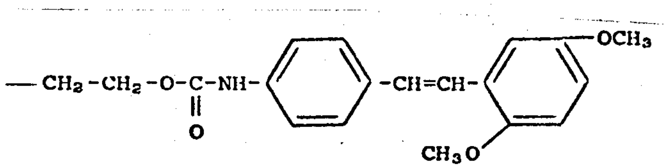

The 2-hydroxyethyl trans-2,5-dimethoxystilbene-4′-carbamate employed in the above procedure was obtained as follows:

A solution of 22.4 g (0.08 mole of trans-2,5-dimethoxy-4′-isocyanatostilbene (U.S. Pat. No. 3,555,071) in 100 ml of acetonitrile was added dropwise to a refluxing solution of 19.9 g (0.32 mole) of ethylene glycol in 200 ml of acetonitrile over a period of 60 minutes. The resulting mixture was heated under reflux for 3 hours. At the end of this time part of the acetonitrile was removed by distillation under reduced pressure until about 90 ml of residue remained. This residue was added to 300 ml of water. The solid which separated was isolated by filtration, washed with water and dried. There was thus obtained 25.5 g (94 percent theoretical yield) of 2-hydroxyethyl trans-2,5-dimethoxystilbene-4′-carbamate which, after recrystallization from benzene, had a melting point of 99 to 104°C.

Anal. Calcd. for $C_{19}H_{21}NO_5$: C, 66.46; H, 6.16; N, 4.08
Found: C, 66.64; H, 6.18; N, 4.28

We claim:

1. A process of chemically bonding a dyestuff selected from the group consisting of acid dyestuffs, basic dyestuffs, direct dyestuffs and mixtures thereof to a substrate containing a plurality of C—H bonds which substrate is not normally receptive to dyestuffs which process comprises:

a. applying to said substrate a radiation-sensitive polymer characterized by the presence, in combination in the same molecule, of each of two recurring units, one of which has the formula:

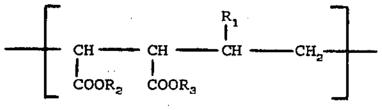

wherein $R_1$ is selected from the class consisting of lower-alkoxy and phenyl, one of $R_2$ and $R_3$ represents hydrogen and the other represents di(lower-alkyl)aminohydrocarbyl wherein hydrocarbyl contains from 1 to 12 carbon atoms inclusive, and the other of said recurring units is represented by the formula:

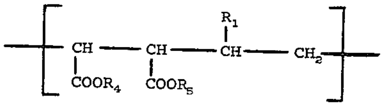

where $R_1$ is as defined above, one of $R_4$ and $R_5$ represents hydrogen and the other represents a group of the formula:

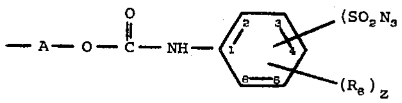

wherein A is alkylene having from 2 to 6 carbon atoms separating the valencies and a total carbon atom content of from 2 to 10, $R_6$ is selected from the class consisting of lower-alkyl and halogen, $y$ is an integer from 1 to 2, $z$ is an integer from 0 to 2, provided that $y + z$ is not greater than 3, and the $SO_2N_3$ group is in any of positions 3, 4 and 5 in the phenyl nucleus to which it is attached and at least one of the said positions 3, 4 and 5 is unsubstituted;

b. exposing the resulting combination of polymer and substrate to appropriate radiation to activate said photosensitive polymer; and c. contacting the treated polymer and substrate with said dyestuff.

2. A process according to claim 1 wherein in step (b) the combination of polymer and substrate is exposed to radiation in selected areas only and the unexposed radiation-sensitive polymer is removed from the combination prior to carrying out step (c).

3. A process according to claim 2 wherein the removal of the unexposed radiation-sensitive polymer is accomplished by dissolving said unexposed polymer in a solvent therefor.

4. A process according to claim 1 wherein the substrate not normally receptive to dyestuffs is a polyolefin.

* * * * *

UNITED STATES PATENT OFFICE
CERTIFICATE OF CORRECTION

Patent No. 3,844,787 Dated October 29, 1974

Inventor(s) Henri Ulrich and Fred A. Stuber

It is certified that error appears in the above-identified patent and that said Letters Patent are hereby corrected as shown below:

Col. 1, Formula I, lines 46-52 and Formula II, lines 59-65 are in reverse order. Formula II should be Formula I placed at lines 46-52 and Formula I should be Formula II placed at lines 59-65.

Should read:

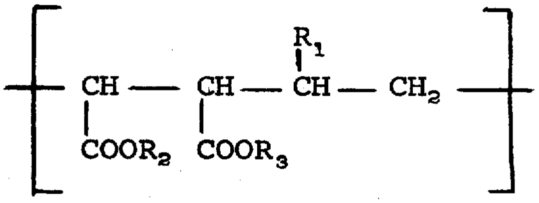

(I)

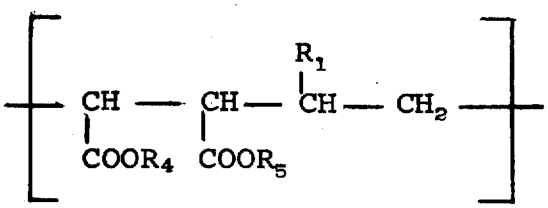

(II)

Col. 2, line 9, "$R_3$" should read -- $R_6$ --.

Signed and sealed this 7th day of January 1975.

(SEAL)
Attest:

McCOY M. GIBSON JR.
Attesting Officer

C. MARSHALL DANN
Commissioner of Patents

ORM PO-1050 (10-69) USCOMM-DC 60376-P69